Aug. 5, 1952     H. M. STEPHENSON     2,605,875
ADJUSTABLE MAGNETIC SLIP BRAKE
Filed July 12, 1950
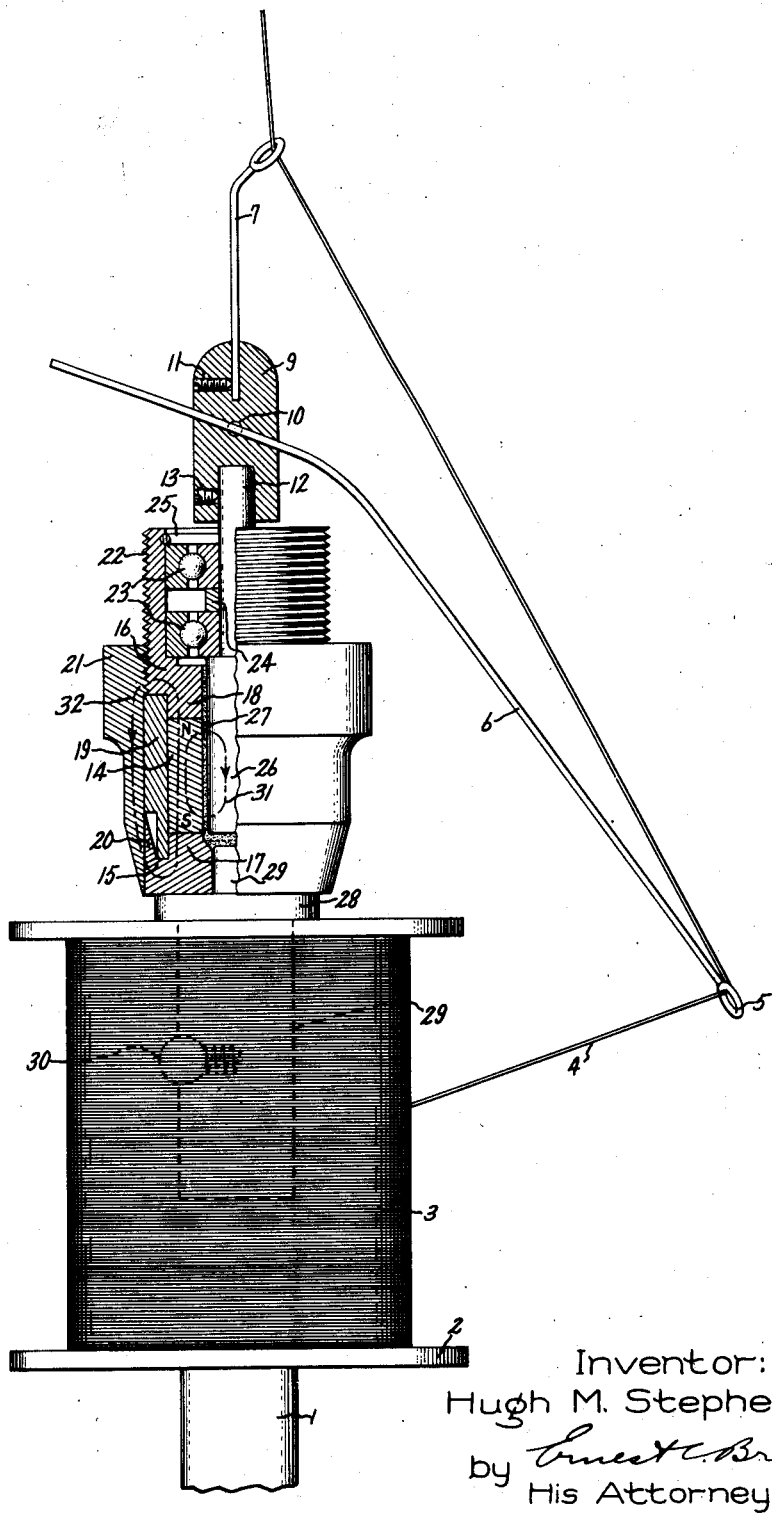
Inventor:
Hugh M. Stephenson,
by Ernest C. Britton
His Attorney.

UNITED STATES PATENT OFFICE 2,605,875

ADJUSTABLE MAGNETIC SLIP BRAKE

Hugh M. Stephenson, Fort Wayne, Ind., assignor to General Electric Company, a corporation of New York Application July 12, 1950, Serial No. 173,251

1 Claim. (Cl. 192—21.5)

My invention relates to devices for transmitting a mechanical movement or force and particularly to tension control devices adaptable for use in handling relatively fine wires wherein a magnetic mixture under the influence of a magnetic field is used to transmit the force.

Wire breakage presents a serious problem, particularly in the handling of a light gauge stock. Considerable difficulty in this respect has been experienced in the handling of fine wire such as copper of a diameter of the order of 0.001". The ideal condition for winding a strand of such wire is to subject the wire to a uniform tension as it is fed from a supply spool to a rotating object. The device of this invention is ideally suited to perform this function.

When the space between adjacent surfaces of two magnetic elements is filled with a finely divided magnetic material, and a magnetic field is established between the two surfaces, the magnetic particles bind the two elements together against movement parallel to their surfaces. These magnetic particles may be finely divided iron, and preferably these particles are mixed with oil to prevent packing and to afford a smooth operation. When this iron-oil mixture is placed under the influence of a magnetic field, the iron particles are mutually attracted, and the mixture seemingly "hardens" or increases to viscosity to variable densities proportional to the applied field. This "hardening" results in a coupling of the two elements, the degree of which is determined by the strength of the magnetic field. The coupling varies very smoothly from a minimum, which is determined by the viscous drag of the oil, to a maximum which is controlled by the magnetic saturation of the iron-oil mixture. Since only a small amount of electrical energy will effect magnetic saturation, a small magnetic potential is adequate to obtain maximum coupling. With a given strength of the magnetic field acting on the mixture, the force transmitted between the elements is constant regardless of the relative speed of movement of the elements. An object of my invention is to provide a device wherein a magnetic fluid transmits mechanical movement or force when acted upon by magnetic field.

Another object of my invention is to provide a device of the magnetic fluid type wherein the force transmitted between relatively rotatable members of the device is made adjustable by providing an alternate flux path of variable reluctance which by-passes the magnetic mixture so that any predetermined portion of the total magnetic flux will act upon the magnetic mixture and thereby pre-set the force transmitted between the members.

A further object of my invention is to provide a brake of magnetic fluid type particularly adapted to be used as a tension control device in conjunction with the reeling of extremely fine wire.

Further objects and advantages of my invention will become apparent and my invention will be better understood from the following description referring to the accompanying drawing, and the features of novelty will be pointed out with particularity in the claim annexed to and forming a part of this specfication.

The drawing is a plan view, partly in section, of a magnetic slip brake device, particularly adapted to be used in controlling the reeling of fine wire, which is provided with an embodiment of my invention.

A feature of my invention is provision of a relative rotatable member having a magnetic core positioned in the annular opening of an axially polarized permanent magnet. This magnetic core serves as a magnetic flux path for the flux produced by the permanent magnet. The space between the core and the permanent magnet is filled with a magnetic mixture so that the magnetic field through the magnetic core acts upon the magnetic mixture to cause it to transmit force between the permanent magnet and the magnetic core. Pole pieces of magnetic material are provided at the polar extremities of the permanent magnet and together with an axially adjustable magnetic sleeve surrounding these pole pieces form an alternate flux path for the flux produced by the permanent magnet. By adjusting the position of the sleeve, the reluctance of this alternate flux path is varied so that any desired percentage of total flux of the magnet may be passed through the alternate path. This results in a change of flux passing through the magnetic mixture thereby resulting in a change of the coupling force between the relatively rotatable members.

As illustrated in the drawing, I provide a fixed support 1 for spool 2 on which is wound turns of fine wire 3. A strand of wire 4 is unwound from spool 2 by being pulled through eye 5 of flyer 6 which revolves about the spool. The strand of wire 4 passes through an eye in guide 7. Flyer 6 and guide 7 are supported by supporting member 9 by means of set screws 10 and 11, respectively. Supporting member 9 is likewise secured to rotary shaft 12 by set screw 13.

The adjustable tension device for controlling the reeling of the wire from the spool comprises an axially polarized permanent magnet ring 14. Permanent magnet ring 14 is provided with annular pole pieces 15 and 16 made of the magnetic material. Annular pole pieces 15 and 16 are provided with offset hubs 17 and 18, respectively, adapted to seat a non-magnetic assembly ring 19. The dimensions of hubs 17 and 18 and ring 19 is such that these parts assemble in a press fit. This makes a unit assembly of pole pieces 15 and 16, the permanent magnet 14, and the assembly ring 19. The outer periphery of pole piece 15 is so machined as to form a polar extremity 20. A magnetic sleeve 21 is in threaded engagement with the threaded outer periphery of pole piece 16. Pole piece 16 has an outer extension 22 which provides a housing for a pair of bearings 23 which rotatably support shaft 12. Bearings 23 are separated by a spacer ring 24 and are held in place by a snap ring 25. Shaft 12 is provided with a downwardly extending cylindrical armature 26 which is positioned in the bore of permanent magnet 14. Armature 26 is of a size so as to provide an annular gap 27 between armature 26 and magnet 14. Gap 27 is filled with magnetically susceptible mixture. While any such mixture could be used, I prefer to use finely divided iron suspended in oil. A support member 28 having an upwardly extending cylindrical boss 29 which is pressed into the bore of pole piece 15 to provide a rigid support for the magnetic slip brake. Support 28 has a downwardly extending rod 29 which is placed into the bore of spool 2. A spring-backed snap ball 30 holds the support 28 in the spool 2. While I have shown pole piece 15 and support member 28 as being made of two parts it is obvious that they could be made as a unitary structure. Permanent magnet 14 produces a magnetic flux which follows a path 31 through armature 26. In doing this, a magnetic field is set up which crosses and recrosses gap 27 and acts upon the iron-oil mixture in gap 27 causing the mixture to "solidify," as hereinbefore explained, and thereby transmit force between permanent magnet 14 and armature 26. An alternate path 32 for the flux is provided through pole piece 16, magnetic sleeve 21, and pole piece 15. The flux passing through this alternate path bypasses the mixture in gap 27 and therefore does not act upon the mixture to produce a coupling effect between the permanent magnet 14 and armature 26. The magnetic reluctance of the alternate path may be varied by adjusting magnetic sleeve 21 axially. With sleeve 21 in the position shown in the drawing, maximum flux bypasses gap 27. However, when sleeve 21 is moved axially upwardly, the magnetic reluctance of this alternate path through sleeve 21 is increased. This results in an increased magnetic field in gap 27 and therefore an increased coupling between permanent magnet 14 and armature 26.

In operation, the tension resulting from unreeling the wire 4 causes flyer 6 to revolve around the spool 2. This causes armature 26 to rotate relative to permanent magnet 14. Depending upon the adjustment of magnetic shunt 21 the mixture in gap 27 transmits a predetermined force tending to prevent armature 26 from turning. This force is constant regardless of the speed of rotation of armature 26. Therefore, the tension on strand of wire 4 is uniform regardless of the speed with which wires are removed from spool 2. Also any sudden increase of tension on strand 4 is cushioned by flyer 6 which is flexible. Likewise, since the rotating portions of this device have a very low inertia due to its construction, it will stop suddenly upon the termination of the force applied in unreeling the wire. If it is desired to change the amount of tension on the wire it is necessary merely to adjust sleeve 21 to change the amount of the flux passing through sleeve 21 and bypassing the mixture in gap 27. While this invention is shown as applied to a brake construction, it will be readily apparent that it is equally applicable to a clutch or dynamometer.

While I have illustrated and described a particular embodiment of my invention, modifications thereof will occur to those skilled in the art. I desire it to be understood therefore, that my invention is not limited to the particular arrangement disclosed, and I intend in the appended claim to cover all modifications which do not depart from the spirit and scope of my invention.

What I claim as new and desire to secure by Letters Patent of the United States is:

In a device of the class described, an outer relatively stationary member and an inner relatively rotatable member journaled in said outer member, an axially polarized permanent magnet ring having pole pieces of magnetic material at its polar extremities, one of said pole pieces being provided with a threaded outer periphery, an adjustable sleeve of magnetic material adapted to provide a flux path of variable reluctance between said pole pieces, said sleeve being provided with threads to engage said threads on said pole piece, said relatively rotatable member comprising an armature of magnetic material positioned in the bore of said magnet and separated therefrom to form a gap, said armature providing a second path for the magnetic flux produced by said magnet, said gap containing a magnetically susceptible mixture, said mixture being acted upon by only the magnetic flux passing through said armature to couple said members together.

HUGH M. STEPHENSON.

REFERENCES CITED

The following references are of record in the file of this patent:

UNITED STATES PATENTS

| Number | Name | Date |
|---|---|---|
| 555,068 | Biddle | Feb 25, 1896 |
| 1,883,039 | Snyder | Oct. 14, 1932 |
| 1,920,962 | Arkema | Aug. 8, 1933 |
| 2,179,334 | Keyes | Nov. 7, 1939 |
| 2,575,360 | Rabinow | Nov. 20, 1951 |

FOREIGN PATENTS

| Number | Country | Date |
|---|---|---|
| 485,591 | Belgium | Nov. 13, 1948 |
| 562,622 | Great Britain | July 10, 1944 |